US007127451B1

(12) United States Patent
Kimura

(10) Patent No.: US 7,127,451 B1
(45) Date of Patent: Oct. 24, 2006

(54) DEVICE SEARCHING METHOD, DEVICE SEARCHING CLIENT, DEVICE, DEVICE SEARCHING SERVER, DEVICE SEARCHING SYSTEM, DEVICE SEARCHING APPARATUS, AND STORAGE MEDIUM

(75) Inventor: Yoshio Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 09/629,972

(22) Filed: Jul. 31, 2000

(30) Foreign Application Priority Data

Aug. 2, 1999 (JP) ................................. 11-219052
Jul. 19, 2000 (JP) ............................. 2000-219007

(51) Int. Cl.
*G06F 17/30* (2006.01)
*G06F 17/00* (2006.01)
*G06F 15/00* (2006.01)
*G06F 3/00* (2006.01)

(52) U.S. Cl. ...................... 707/3; 707/104.1; 358/1.14; 710/15

(58) Field of Classification Search .............. 707/1–10, 707/104.1, 3; 709/223–226; 358/1.13–1.15; 710/15–19

See application file for complete search history.

(56) References Cited

U.S. PATENT DOCUMENTS

| | | | | |
|---|---|---|---|---|
| 5,169,133 A | * | 12/1992 | Iwata et al. | 270/58.11 |
| 5,768,516 A | * | 6/1998 | Sugishima | 709/217 |
| 6,003,065 A | * | 12/1999 | Yan et al. | 709/200 |
| 6,208,428 B1 | * | 3/2001 | Chihara et al. | 358/1.13 |
| 6,310,692 B1 | * | 10/2001 | Fan et al. | 358/1.14 |
| 6,348,971 B1 | * | 2/2002 | Owa et al. | 358/1.15 |
| 6,389,544 B1 | * | 5/2002 | Katagiri | 713/300 |

OTHER PUBLICATIONS

Isaacson ("A model for Internet printing", ACM, Dec. 1998, pp. 147-156).*
David Gelernter, "Generative Communication in Linda," ACM Transactions on Programming Languages and Systems, vol. 7, No. 1, pp. 80-112 (1985).

* cited by examiner

*Primary Examiner*—Joon Hwan Hwang
(74) *Attorney, Agent, or Firm*—Fitzpatrick, Cella, Harper & Scinto

(57) ABSTRACT

To provide a device searching client which can extract, for example, dynamic search conditions which are peculiar to a printing matter (print job), search a device, and correctly print, in a printer as a device searching client, a CRT has search condition input means for allowing the user to input not only static data but also dynamic data as search conditions.

7 Claims, 13 Drawing Sheets

FIG. 4

DIRECTORY REGISTRATION INFO 400

| DEVICE NAME | NETWORK ADDRESS | OBJECT CLASS | DEVICE TYPE | COLOR | DOUBLE/ SINGLE PRINTING | STAPLING | NO. OF SHEETS-LOADED | | | NO. OF STAPLES REMAINING |
|---|---|---|---|---|---|---|---|---|---|---|
| | | | | | | | A4 | A3 | ... | |
| MR. COLOR | 192.168.16.131 | PRINTER | PRINTER | 1 | 0 | 1 | 83 | 21 | | 51 |
| 2F FAST | 192.168.16.132 | PRINTER | MFP | 0 | 1 | 1 | 99 | 10 | | 24 |
| DEVELOP PRINTER | 192.168.16.155 | PRINTER | PRINTER | 0 | 0 | 1 | 12 | 0 | | 0 |
| 1F PRINTER | 192.168.16.156 | PRINTER | PRINTER | 0 | 1 | 0 | 0 | 0 | | 0 |
| SCAN | 192.168.16.32 | SCANNER | SCANNER | NA | NA | NA | NA | NA | | NA |
| ...... | | | | ...... | ...... | | | | | |

FIG. 7

DIRECTORY REGISTRATION INFO 400

| DEVICE NAME | NETWORK ADDRESS | OBJECT CLASS | DEVICE TYPE | COLOR | DOUBLE/ SINGLE PRINTING | STAPLING | NO. OF SHEETS-LOADED | | ... | NO. OF STAPLES REMAINING |
|---|---|---|---|---|---|---|---|---|---|---|
| | | | | | | | A4 | A3 | | |
| MR. COLOR | 192.168.16.131 | PRINTER | PRINTER | 1 | 0 | 1 | 83 | 21 | | 51 |
| 2F FAST | 192.168.16.132 | PRINTER | MFP | 0 | 1 | 1 | 99 | 10 | | 24 |

FIG. 9

SEARCH CONDITION 901

(&(OBJECTCLASS=PRINTER)
(COLOR=1)
(DOUBLESIDED=1)
(STAPLE=1)
(PAGES=20)
STAPLES=1))

INQUIRY CONDITION 902

(OBJECTCLASS=PRINTER)

DEVICE SEARCHING METHOD, DEVICE SEARCHING CLIENT, DEVICE, DEVICE SEARCHING SERVER, DEVICE SEARCHING SYSTEM, DEVICE SEARCHING APPARATUS, AND STORAGE MEDIUM

BACKGROUND OF THE INVENTION

1. Field of the Invention

The invention relates to a device searching method, a device searching client, a device, a device searching server, a device searching system, and a device searching apparatus for searching a device connected to a network and to a storage medium in which a control program for controlling them has been stored.

2. Related Background Art

Hitherto, as a method of efficiently searching and using various resources (printer, server, scanner, and the like) on a network, a method called a directory service has been proposed.

The directory service is a so-called telephone directory regarding a network and used to store various information. As a specific example of the directory system, for example, there is an LDAP (Lightweight Directory Access Protocol). The regulation of the LDAP has been disclosed in RFC (Request for Comments) 1777 issued by IETF (Internet Engineering Task Force). As a description, for example, "LDAP Internet Directory Application Programming" has been issued by Prentice Hall in Nov. 1, 1997.

A list of network addresses of the device which can be used on the network can be obtained by, for example, searching a device connected to the network by using the directory service.

In the above conventional technique, however, in case of a network printer, for example, as a device, at the time of searching it, various attributes regarding a static ability of a printer main body such as presence or absence of a stapling function, presence or absence of support of a double/single printing, and the like are designated and the device is searched. In case of actually printing, there is such a problem that a leakage occurs in search conditions which are changed every printing matter (print job) and are peculiar to a printing matter (print job) such that 100 or more sheets of papers need to be set on the printer main body side in order to print 100 pages, so that in spite of the fact that the device was searched and the printer was specified, the printing cannot be performed because the printing operation is actually stopped during the operation or the like.

SUMMARY OF THE INVENTION

The invention is made in consideration of the problem of the conventional technique as mentioned above and it is the first object of the invention to provide a device searching method, a device searching client, a device, a device searching server, a device searching system, and a device searching apparatus in which it is possible to correctly search by search conditions in consideration of dynamic data, so that a proper device can be selected with respect to, for example, a printing matter (print job) to be printed and the printing can be smoothly performed.

To accomplish the first object, according to claim 1 of the invention, there is provided a device searching method of searching a device connected to a network, comprising a search condition input step of allowing the user to input not only static data but also dynamic data as search conditions.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram showing an example of device information possessed by a device searching server in the network device searching system according to the first embodiment of the invention;

FIG. 7 is a diagram showing an example of a device search result in the network device searching system according to the first embodiment of the invention;

FIG. 9 is a diagram showing an example of search conditions and inquiry conditions which have temporarily been held in the device searching client in the network device searching system according to the first embodiment of the invention;

DETAILED DESCRIPTION OF THE PREFERRED EMBODIMENTS

Embodiments of the present invention will now be described hereinbelow with reference to the drawings.

First Embodiment

The first embodiment of the invention will be first described with reference to FIGS. 1 to 13.

As will be explained in detail hereinbelow, according to the invention, a network device having attributes which the user desires is easily and correctly searched and a search result is displayed in a format which can be easily understood by the user.

The invention is particularly effective in case of connecting a portable computer to a network on a visit destination side and printing.

Figure 1:
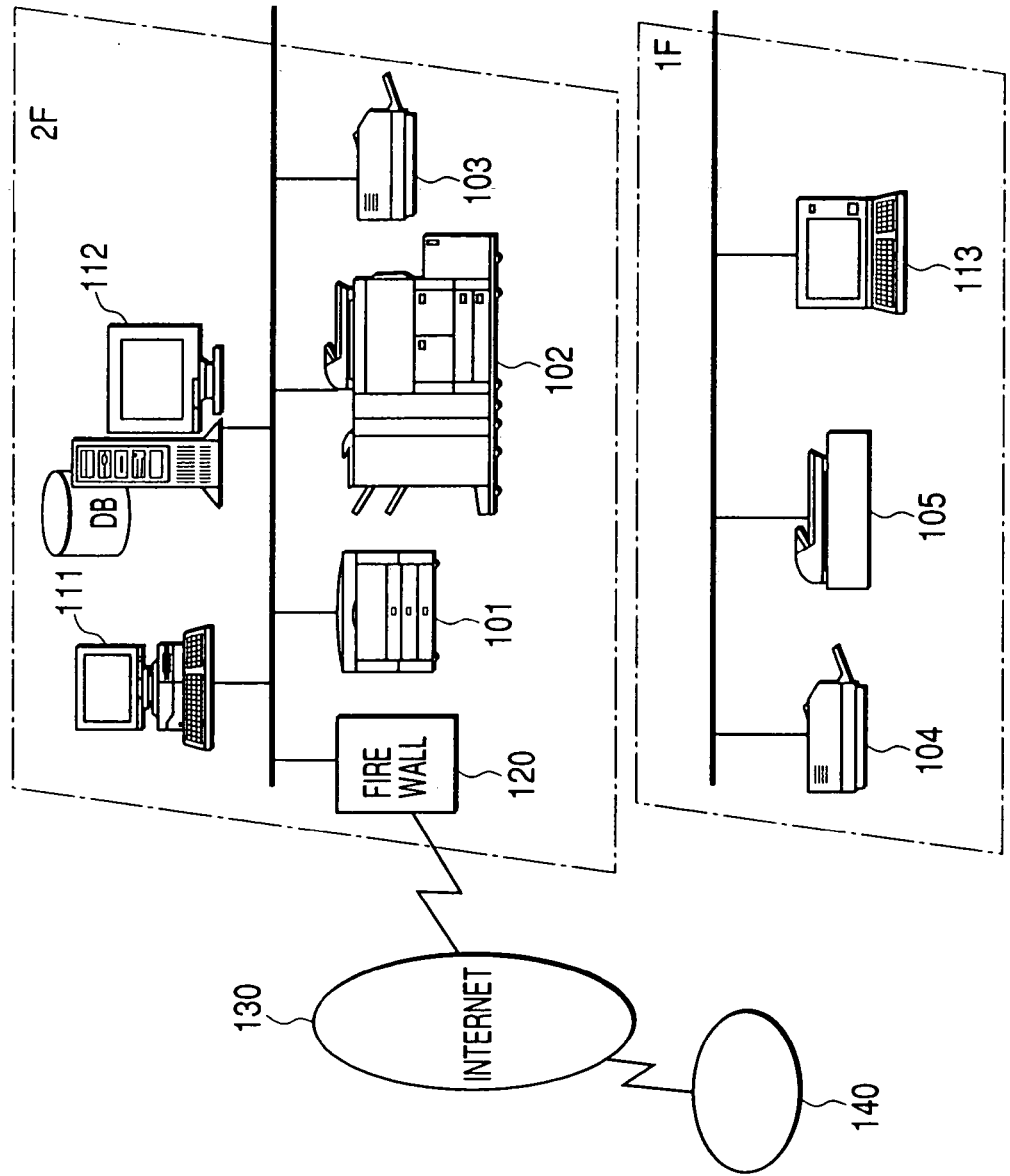
FIG. 1 is a diagram showing a construction of a network system in which a network device searching system according to the first embodiment of the invention can operate.

FIG. 1 is a diagram showing a construction of a network system in which a device searching system according to the embodiment can operate. In the diagram, reference numeral 101 denotes a color printer; 102 an MFP (Multi Function Peripheral: copying apparatus which can be used also as a network printer); 103 and 104 monochromatic printers; and 105 a scanner connected to the network. Reference numeral 111 denotes a desk-top type personal computer (hereinafter, referred to as a desk-top type PC); 112 a desk-top type personal computer having a device searching server function (hereinafter, referred to as a desk-top type PC, a directory server PC, or a device searching server); 113 a notebook-sized personal computer (hereinafter, referred to as a notebook-sized PC); and 120 a fire wall. All of those devices are network corresponding devices.

The desk-top type PC 111 and notebook-sized PC 113 are PCs which can execute a program of a network device searching client in the embodiment, issue inquiry information regarding a device which meets desired conditions to a network device searching server as will be explained hereinlater, and display a search result. The desk-top type PC 112 is a PC which can execute a program of a network device searching server in the embodiment. As will be explained hereinlater, information regarding the network devices (the color printer 101, MFP 102, monochromatic printers 103 and 104, and scanner 105) has been stored in the desk-top type PC 112. The PC 112 accepts a device search inquiry from the network device searching client (desk-top type PC 111 or notebook-sized type PC 113) and returns an inquiry result.

Among those devices, the color printer 101, MFP 102, monochromatic printer 103, desk-top type PC 111, directory server PC 112, and fire wall 120 are installed on the second floor (2F), and the monochromatic printer 104 and scanner 105 are installed on the first floor (1F). Although the notebook-sized PC 113 is connected to a network 100 from the first floor at present, they can be also removed as necessary.

The network 100 for mutually connecting those devices is connected to an Internet 130 via the fire wall 120 and also connected to another network 140 via the Internet 130.

In the network system, the client makes a search request of the device to the device searching server (directory server) 112. The client obtains a result searched by the device searching server 112 and displays the search result to the display unit. Such a device control that, for example, a print job is transmitted to the searched device so as to print by a user instruction to the searched device can be made.

Therefore, even in the case where a mobile computer is newly connected as a client to the network, if the device searching server 112 can be found, a control instruction can be made by using all of the devices which the user wants to use on the network.

Figure 2:
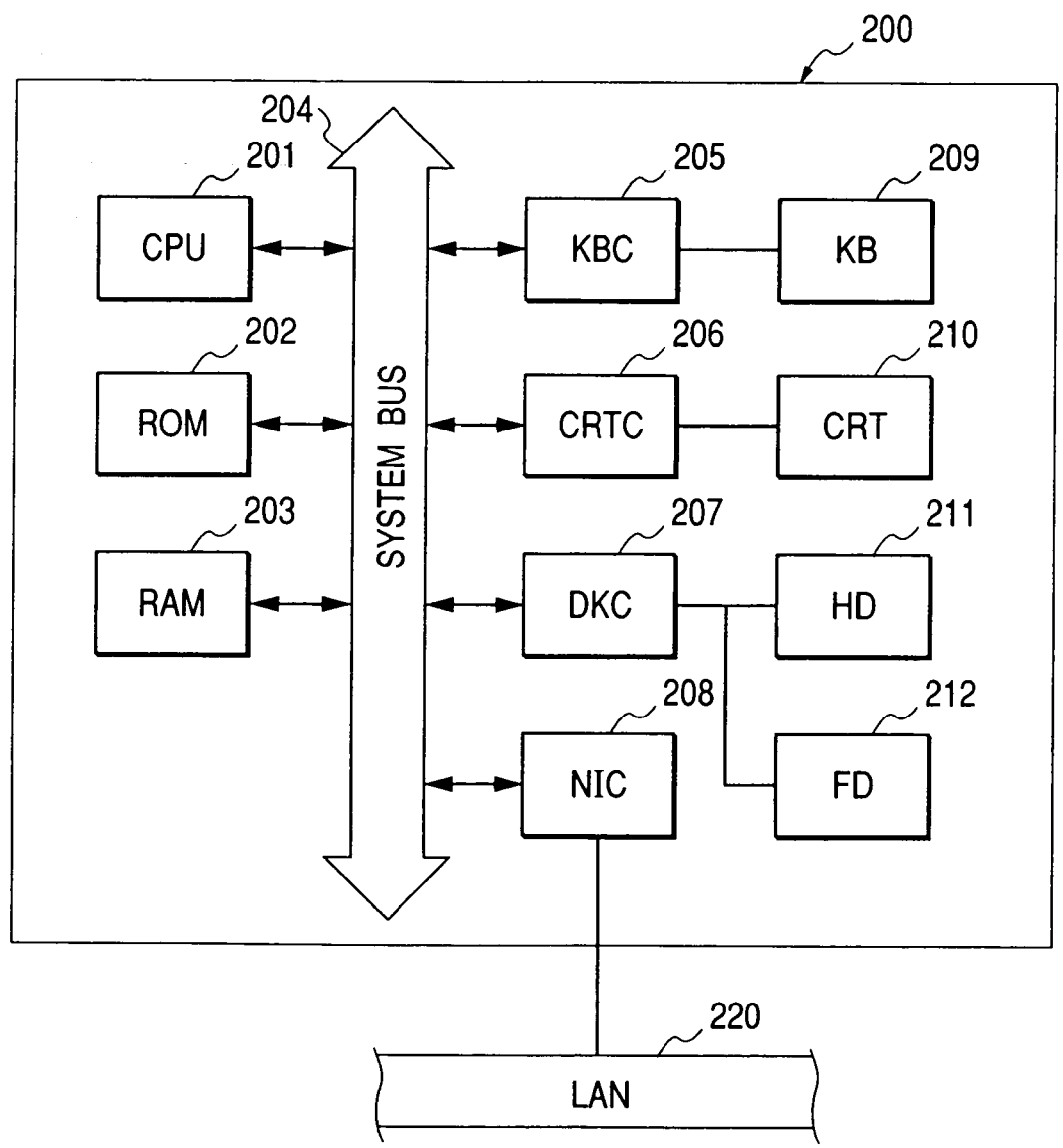
FIG. 2 is a block diagram showing an internal construction of a general personal computer in the network device searching system according to the first embodiment of the invention.

FIG. 2 is a block diagram showing an internal construction of a general personal computer. In the diagram, reference numeral 200 denotes a PC (personal computer) which is similar to the desk-top type PC 111, device searching server 112, or notebook-sized PC 113 in FIG. 1.

The PC 200 is a PC in which network device searching client software including a device search request program or network device searching server software including a device search program (hereinafter, they are referred to as network device search software) operates. The PC 200 (111, 113) as an information processing apparatus for issuing the device search request makes the device search request program operative. The device searching server 112 for searching the device on the basis of the request from the PC 200 makes the device search program operative. The PC 200 has a CPU (Central Processing Unit) 201. The CPU 201 executes network device search software (device search request program or device search program) which has been stored in an ROM (Read Only Memory) 202 or an HD (Hard Disk) 211 or is supplied from a floppy disk drive (FD) 212 and integratedly controls the devices connected to a system bus 204.

Reference numeral 203 denotes an RAM (Random Access Memory) which functions as a main memory or a work area of the CPU 201; 205 a keyboard controller (KBC) for controlling an instruction input from a keyboard (KB) 209 or a pointing device (not shown) or the like; 206 a CRT (Cathode Ray Tube) controller (CRTC) for controlling a display of a CRT display (CRT) 210; and 207 a disk controller (DKC) for controlling accesses to the HD (Hard Disk) 211 and floppy disk drive (FD) 212 for storing a boot program, various applications, an edition file, a user file, a network management program, and the like. Reference numeral 208 denotes a network interface card (NIC) for bidirectionally transmitting and receiving data to/from a network printer, another network apparatus, or another PC (Personal Computer) via an LAN (Local Area Network) 220.

In the embodiment, the LAN 220 is the same as the network 100 in FIG. 1.

Figure 3:
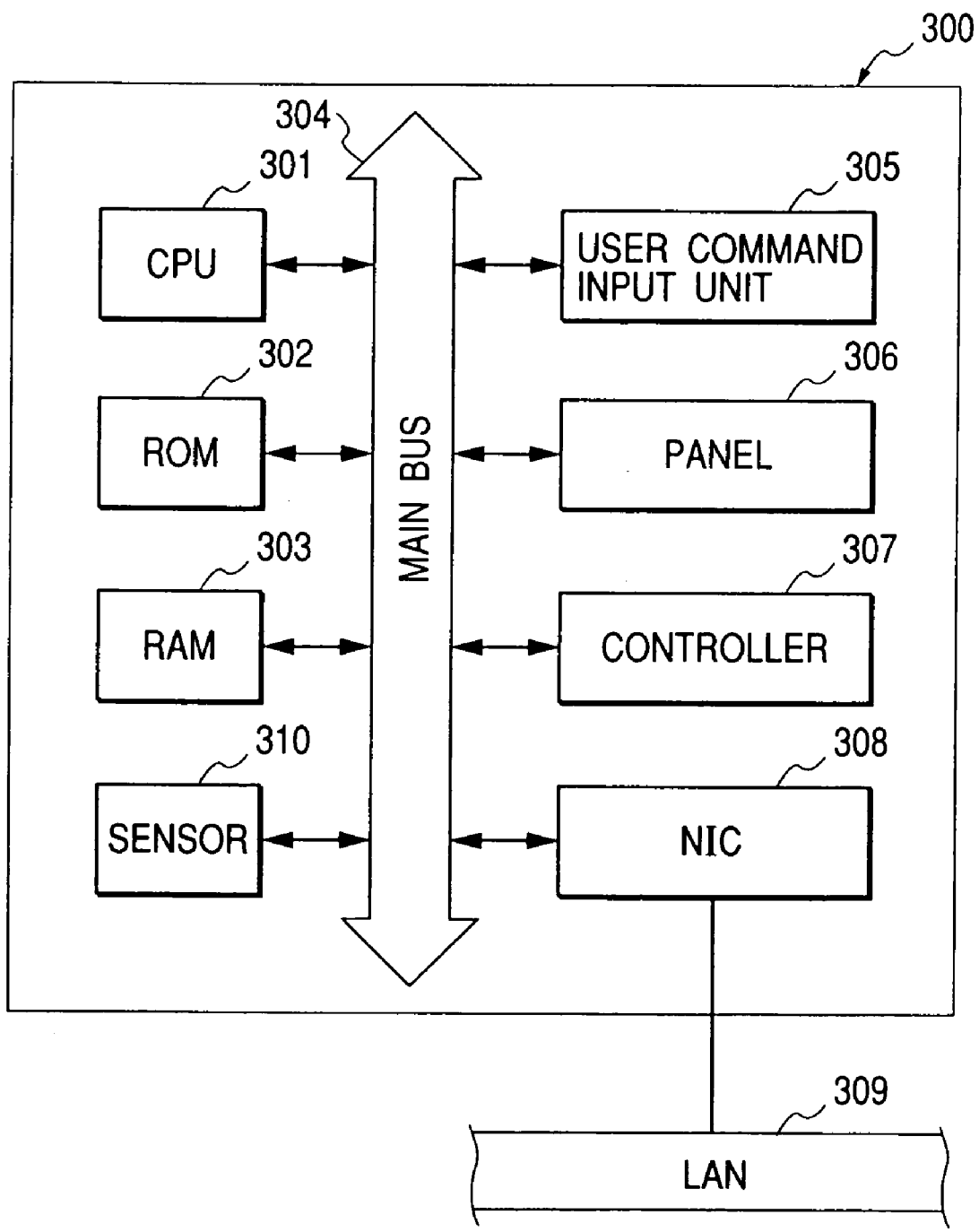
FIG. 3 is a block diagram showing an internal construction of a general printer in the network device searching system according to the first embodiment of the invention.

FIG. 3 is a block diagram showing an internal construction of a general printer. In the diagram, reference numeral 300 denotes a printer as a network device which is the same as each of the color printer 101, MFP 102, and monochromatic printers 103 and 104 in FIG. 1.

The printer 300 has a CPU (Central Processing Unit) 301. The CPU 301 executes notification software including a device information registration program which is supplied from a storage medium such as ROM (Read Only Memory) 302, RAM (Random Access Memory) 303, or the like and integratedly controls devices connected to a system bus 304. The device information registration program includes a device function information registration program for registering device function information and an expendable supplies information registration program for registering expendable supplies information. The device function information and expendable supplies information will be explained hereinlater.

Reference numeral 303 denotes the RAM (Random Access Memory) which functions as a main memory or a work area of the CPU 301; 305 a user command input unit for controlling an instruction input from a panel button of the apparatus main body or the like; 306 a panel display unit for controlling a state of the main body and displaying the status of the main body to a liquid crystal display or the like in a main body panel; 307 a controller for controlling the main body as a printing device; and 308 a network interface card (NIC) for bidirectionally transmitting and receiving data to/from a network printer, another network apparatus, or another PC (Personal Computer) via an LAN (Local Area Network) 309.

Reference numeral 310 denotes a sensor (data detecting means) for detecting dynamic data which is inputted from the device searching client (111, 113, etc.) for searching the device. The sensor in the embodiment includes a sensor for completion of a paper ejection, a sensor for the number of sheets loaded, a sensor for the number of remaining staples, and the like as will be explained hereinlater in FIG. 13.

In the embodiment, the LAN 309 is the same as the network 100 in FIG. 1.

A construction and the operation of the device searching server will now be described.

FIG. 4 is a diagram showing data regarding the network equipment stored in the device searching server 112 in FIG. 1 in a table format. In the device searching server 112 in FIG. 1, the information of the database has physically been stored in the hard disk 211 in FIG. 1.

In FIG. 4, reference numeral 400 denotes directory registration information (data regarding the network device). In the directory registration information 400, one row in the table shows one network device. Each column in the table shows: a device name 401; a network address 402 of the network device; an object class 403 indicative of a type of function of the network device; a device type 404 showing a type of network device; a color 405 showing whether a color printing can be performed or not; a double/single printing 406 showing whether a double printing can be performed or not; a stapling 407 showing whether a stapling function is supported or not; the number of sheets loaded 408 indicative of the number of sheets loaded every paper size; and the number of remaining staples 409 showing the number of remaining staples for stapling, respectively.

In the embodiment, although the number of sheets loaded 408 and the number of staples remaining 409 will be described as specific examples of the data which is peculiar to the print job and dynamically changes, another data which dynamically changes, for example, an amount of remaining toner or the like can be also used. The dynamic data is information regarding the expendable supplies as mentioned above. The conditions of the expendable supplies are different every print job and the device search according to the print job can be performed.

Similarly, as specific examples of the static data of the network device, messages showing whether the color printing can be performed or not, whether the double printing can be performed or not, and whether the stapling function is supported or not are described. However, another data regarding an ability of the static network device, for example, data showing whether a sorting operation can be performed or not or the like can be also used. As mentioned above, the static data is information regarding the function of the device which is used by the print job and device function conditions are also different in dependence on the request of the print job.

The object class shows a type of equipment of the device (device class). For example, if the device has a printing unit, even if this device is the MFP, the device class (also called an object class) can be also registered as a device of a printer class. The device type shows the whole function of the device and is distinguished from the sole printer and MFP.

In the expression of each of the color 405, double/single printing 406, and stapling 407 in FIG. 4, "1" indicates that such a function is supported and "0" denotes that such a function is not supported, respectively. "NA" denotes that the information regarding the attribute is not stored. The number of sheets loaded 408 indicates the number of loaded sheets of each paper size. Although there are items for all of the paper sizes, the items of only the A4 paper and A3 paper are displayed for simplicity of explanation. However, the printer has all of the kinds of papers supported by the print device. The number of remaining staples 409 indicates the number of remaining staples for stapling and is equal to the number of remaining times of the stapling operation which can be performed.

The data shown in FIG. 4 will be specifically explained with respect to, for example, the network device registered on the first row of the table. The device of the name "Mr. Color" exists in the network address "192.168.16.131". It will be understood that this device has the printing function and is a sole printer as a form, and although the color printing and the stapling are supported as attributes, the double printing function is not supported. It will be also understood that 83 sheets of A4 papers are loaded at present, 21 sheets of A3 papers are loaded at present, and the stapling operation can be performed 51 times, respectively.

In the embodiment, it is assumed that the devices of the first to fifth rows in the table shown in FIG. 4 correspond to the color printer 101, MFP 102, monochromatic printers 103 and 104, and scanner 105 in FIG. 1, respectively.

The registration of the device name, network address 402, object class (device class) 403, and device type 404 is requested from the registration target device when the device is newly registered into the directory server (device searching server). The registration of the static data such as color function 405, double/single printing function 406, and stapling function 407 is requested from the registration target device when a main power source of the device is turned on, and they are registered into the directory server. The registration of the dynamic data as expendable supplies information such as number of sheets loaded 408 and number of remaining staples 409 is requested at an arbitrary timing from the registration target device, and they are registered into the directory server.

Figure 5:
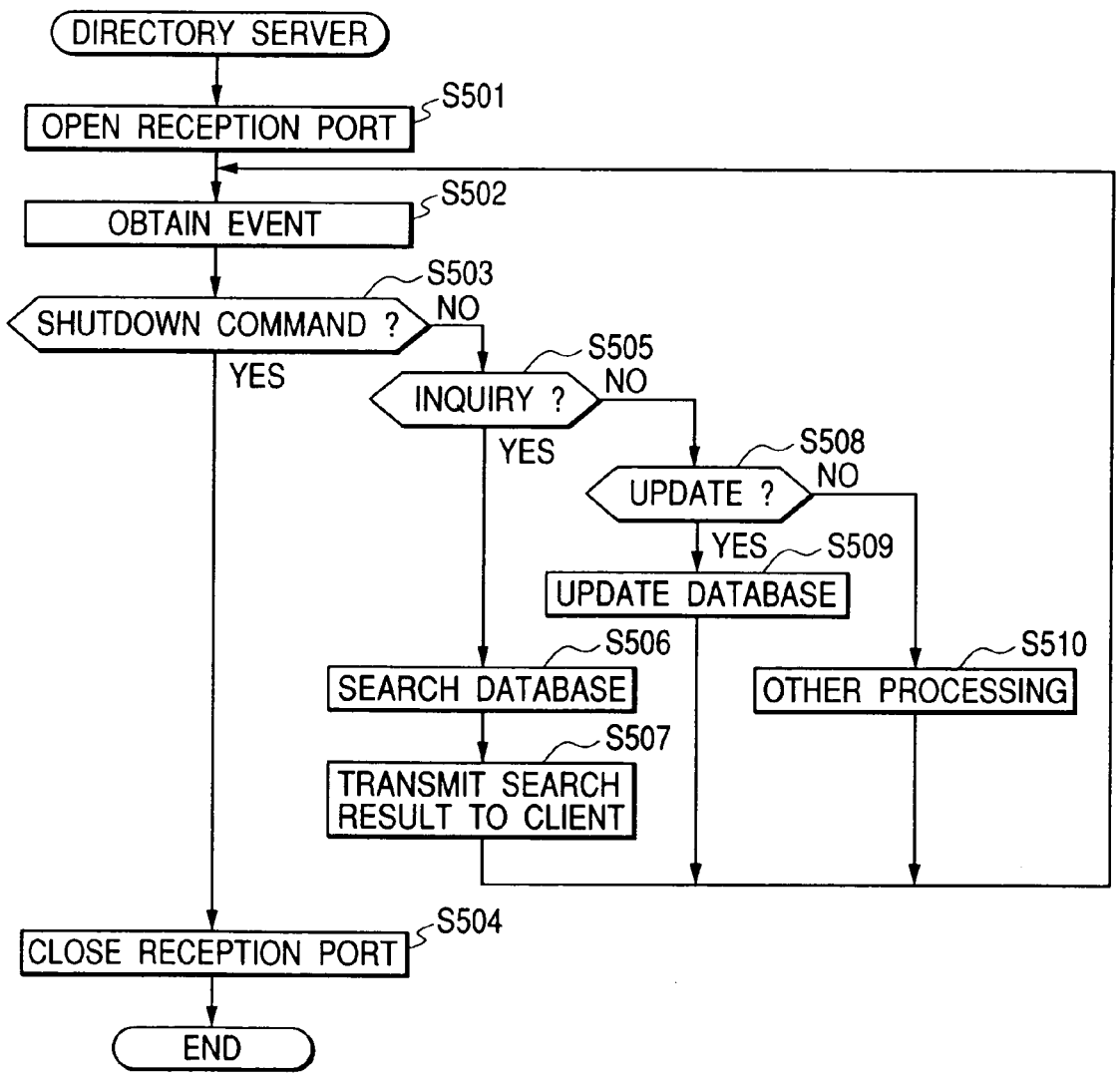
FIG. 5 is a flowchart showing a flow for the operation of the device searching server in the network device searching system according to the first embodiment of the invention.

FIG. 5 is a flowchart showing a flow for the operation of the network device searching server (directory server) 112 according to the embodiment. The discrimination and execution of those series of processes are executed by the CPU 201 in the network device searching server 200 in a hardware manner.

When the network device searching server 112 in FIG. 1 is activated, in FIG. 5, first in step S501, a reception port to accept a device search request from the device searching client is opened. When the search request from the device searching client is received, the operating system issues a reception event and the reception of the search request is notified to the program. The reception port also accepts a registration request from the device besides the search request from the client.

In step S502, the network device searching server 112 waits until some event is notified from the operating system. When some event is notified, the network device searching server 112 obtains the event and next step S503 follows. In step S503, the network device searching server 112 discriminates whether the event obtained in step S502 is a system shutdown event (shutdown command) by the user or not. If it is determined that the event is the system shutdown event by the user, next step S504 follows and the network device searching server 112 closes the reception port. After that, the processing routine is finished.

If it is determined in step S503 that the event is not the system shutdown event, step S505 follows. The network device searching server 112 discriminates whether the event is an inquiry reception event from the device searching client or not. If it is determined that the event is the inquiry reception event from the device searching client, next step S506 follows. The network device searching server 112 receives inquiry conditions from the device searching client and extracts the static data showing the device functions and the dynamic data showing the amount of expendable supplies from the inquiry conditions. The network device searching server 112 refers to the database in which the device information (including the static data and the dynamic data) shown in FIG. 4 on the basis of the extracted conditions (static and dynamic data), collates them with the inquiry conditions, and selects the proper device (database searching process). The details of the database searching process in step S506 will be described hereinlater with reference to FIG. 6.

Subsequently, in step S507, the network device searching server 112 transmits the search result obtained in step S506 to the device searching client. After that, the processing routine is returned to step S502. The search result which is transmitted from the network device searching server 112 to the network device searching client is device information of the device on the network which meets the conditions from the network device searching client and includes various information managed in the database.

If it is determined in step S505 that the event is not the inquiry reception event from the device searching client, step S508 follows and the network device searching server 112 discriminates whether the event indicates the updating reception of the database from the peripheral device which has already been managed on the network or the peripheral device newly connected onto the network or not. If it is determined that the event indicates the updating reception of the database, next step S509 follows and the database is updated. After that, the processing routine is returned to step S502.

The updating process of the database is executed as follows. First, in the case where the updating request is issued from the peripheral device newly connected onto the network or where the power source is turned on and the updating request is issued from the peripheral device which was newly accessed onto the network, the CPU 201 forms a new record into the database, sequentially stores the type of apparatus as an object class (device class), the device function information as static data, and expendable supplies information as dynamic data, and manages them on the basis of a device information registration updating program as a lower module of the device search program which operates in the device searching server 112. In the case where the updating request is issued from the peripheral device which has already been managed, the CPU 201 reads out a record corresponding to the target device which has already been managed in the database and overwrites the expendable supplies information as dynamic data of this record by the information included in the updating request contents on the basis of the device information registration updating program.

If it is determined in step S508 that the event is not the updating reception of the database, step S510 follows. The network device searching server 112 executes other processing, for example, an updating of the screen or the like. After that, the processing routine is returned to step S502.

Figure 6:
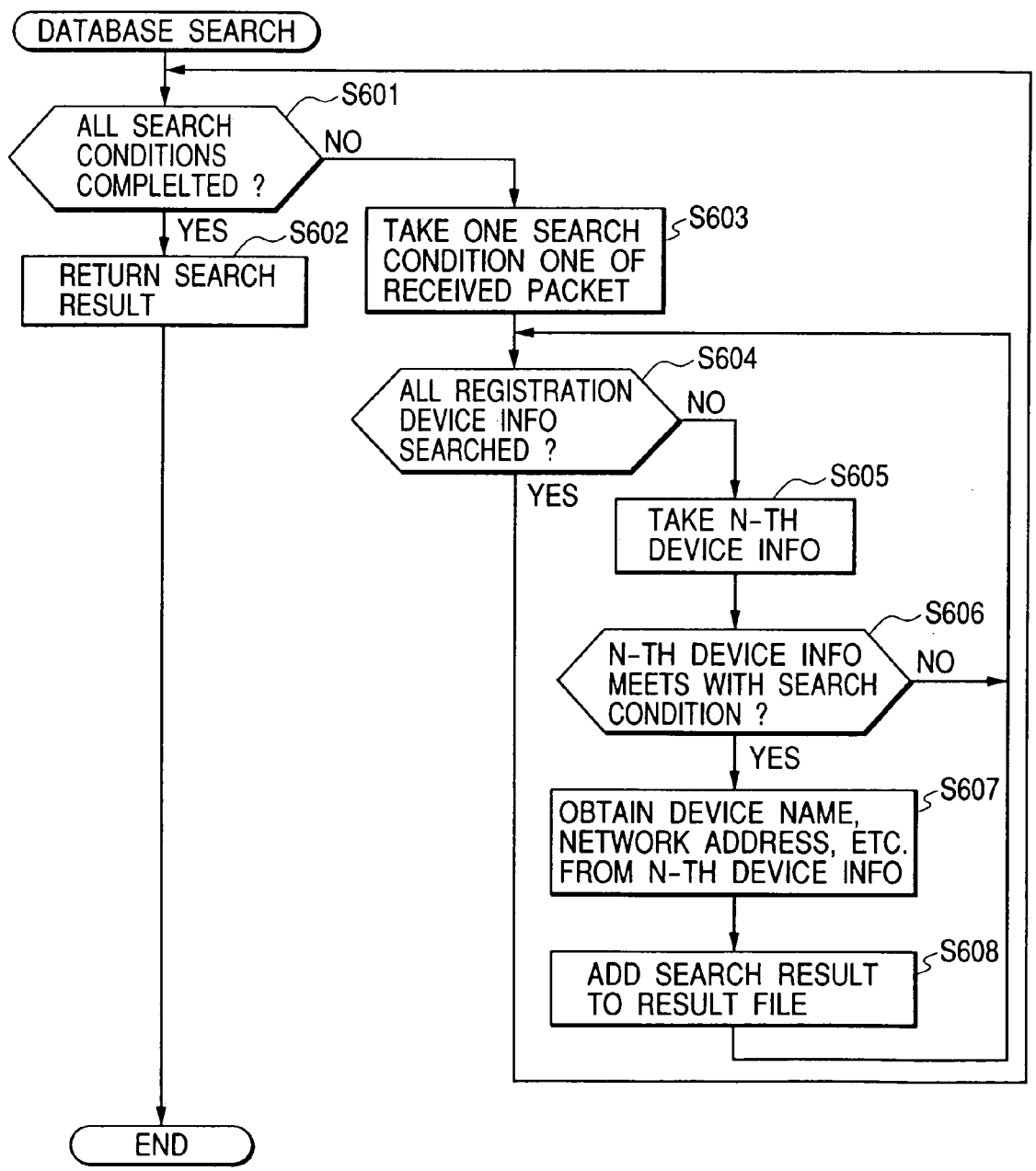
FIG. 6 is a flowchart showing a flow for the processing operation in a database searching step of the device searching server in the network device searching system according to the first embodiment of the invention.

FIG. 6 is a flowchart showing a flow for the database search processing operation in step S506 in FIG. 5.

The whole construction will be simply described. In the database search processing step (step S506 in FIG. 5) in the embodiment, the method whereby the network device searching server 112 processes a plurality of search conditions one by one is used. This method corresponds to an outside loop discriminated in step S601 in FIG. 6. An inside loop which is discriminated in step S604 in FIG. 6 is provided to search (scan) all of the registration information in the database with respect to one search condition.

Each processing step will now be described.

In FIG. 6, when the database searching process is started, first in step S601, the network device searching server 112 discriminates whether the processes of all of the search conditions included in the search request from the device searching client (client 111 (113) which issued the search request of the device) have been finished or not. If it is determined that the processes of all of the search conditions were finished, next step S602 follows. The network device searching server 112 returns the search result to an upper program and, thereafter, finishes the present processing operation. The upper program is a result transmission program for transmitting the result in step S507 in FIG. 5.

If it is determined in step S601 that the processes of all of the search conditions are not finished, step S603 follows. The network device searching server 112 extracts one search condition from the search request information received from the device searching client. Subsequently, in step S604, the network device searching server 112 discriminates whether all of the data (registration device information) 400 regarding the network device described in FIG. 3 has been scanned (searched) or not on the basis of the search condition to be processed. If it is determined that all of the data (registration device information) 400 has been scanned (searched), the processing routine is returned to step S601 and the network device searching server 112 executes the process of the next search condition.

If it is decided in step S604 that all of the data (registration device information) 400 is not scanned (searched), step S605 follows and the network device searching server 112 takes out the data of one device from the data 400 in FIG. 4. Subsequently, step S606 follows and the network device searching server 112 discriminates whether the data taken out in step S605 meets the search condition to be searched at present or not. If it is decided that the data meets the search condition, next step S607 follows. The network device searching server 112 takes out the device name 401, network address 402, device type 404, color 405, double/single printing 406, stapling 407, the number of sheets loaded 408, and the number of staples remaining 409 in FIG. 4 in the information of the device which was determined to meet the search condition in step S606. In next step S608, the network device searching server 112 adds the search result to a temporary result file. The processing routine is returned to step S604 and the search (scan) of the next data is continued.

As for the second and subsequent search conditions, the registration device information to be searched in step S604 does not need to be searched with respect to all of the registration devices registered in the directory registration information shown in FIG. 4. It is desirable to converge and search the registration device information stored in the temporary result file in order to efficiently search the device information. In case of performing the convergence search, the device information which meets one search condition is added to the temporary result file. The network device searching server 112 controls so as to delete the device information which does not meet the search condition from the temporary result file. In step S602, the network device searching server 112 returns the device information of the network device which meets all of the search conditions as a search result to the upper program from the temporary result file.

Even if it is determined in step S606 that the data taken out in step S605 does not meet the search condition, the processing routine is returned to step S604 and the network device searching server 112 continues the search (scan) of the next data.

The operation on the device searching client side will be described hereinlater. For example, it is now assumed that the device searching client requested a search of the device such that the object class indicates the printer and a printing in which 20 pages of A4 papers are stapled can be performed. With respect to those conditions (device class: printer, static condition (data): stapling, dynamic conditions (data): 20 A4 papers and one staple), FIG. 7 shows a result obtained by searching the device data shown in FIG. 4 in accordance with the algorithm shown in FIG. 6.

In FIG. 7, there are two devices which meet the conditions such that a printing in which 20 pages of A4 papers is stapled can be performed, namely, which meet all of the conditions such that the object class (device class) is the printer, the stapling is possible as a static condition, and the number of sheets loaded of A4 papers is equal to or larger than 20 pages as a dynamic condition. With respect to each device, information of a device name 701, a network address 702, an object class 703, a device type 704, a color 705 indicative of the presence or absence of a color function, a double/single printing 706 showing the presence or absence of the double printing, a stapling 707 showing the presence or absence of the stapling function, the number of sheets loaded 708, and the number of staples remaining 709 is shown.

As mentioned above, since the apparatus has: the device information holding means (corresponding to the process of the CPU 201 based on the device information registration updating program as a lower module of the device search program) for holding the device information including the dynamic information (expendable supplies information) of each device into its own database for a plurality of devices on the network; and the searching means (corresponding to the process of the CPU 201 based on the device search program) for enabling the search to be performed by the database in response to the request from the device searching client for requesting the search of the device connected to the network. Therefore, it is possible to enable the client to use the database holding the dynamic information of the device on the network for the searching process.

Since the apparatus has the data updating means (process of the CPU 201 based on the device information registration updating program) for updating its own database in the case where the updating request of the device information is issued from the device on the network, the dynamic information in the device can be updated and the correct search can be performed.

The operation of the network device searching client will now be described.

An explanation of a construction of hardware is omitted here because the construction which has already been described in FIG. 2 can be applied as it is.

Figure 8:
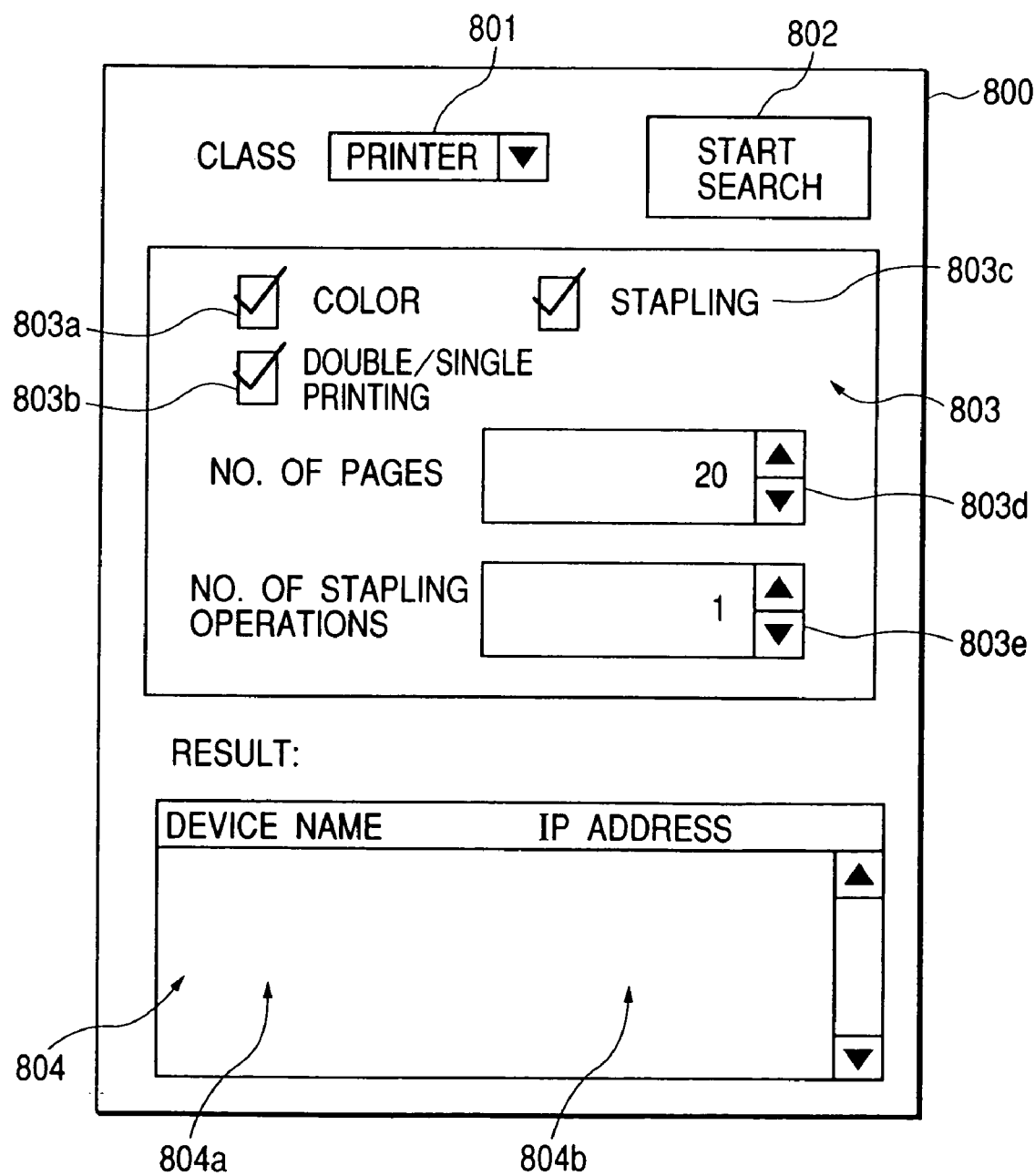
FIG. 8 is a diagram showing a screen display example of a device searching client at a point before a device search in the network device searching system according to the first embodiment of the invention.

FIG. 8 is a diagram showing a screen display example of the network device searching client prior to searching the device. This screen corresponds to a user interface which is provided for the OS by a part (UI providing program) of the device search request program. The OS converts the user interface (actually constructed by a plurality of definition functions) which is provided by the UI providing program into a draw function which can interpreted by a display driver and allows it to be displayed on a display unit.

In the diagram, reference numeral 800 denotes a window as search condition input means in which various information is displayed. Reference numeral 801 denotes a combobox for designating an object class (device class) of the device to be searched. By operating the combobox 801 by using a pointing device such as a mouse or the like, the object class of the device to be searched can be changed to, for example, "printer", "scanner", or the like. Search attribute conditions of an area 803 to designate a search attribute change to attributes according to the object class in correspondence to the change of the object class.

Reference numeral 802 denotes a start search button. In correspondence to the operation such that the user depresses the start search button 802 by using the keyboard 209 in FIG. 2 as a command input unit such as keyboard, pointing device, or the like, a transmitting process of a search request as an inquiry about whether there is a device which meets the conditions is executed for the device searching server by the device search request program.

Reference numeral 803 denotes an area to designate the search attributes. Since the printer is selected at present as an object class by the combobox 801, the attributes regarding the printer are shown in the area 803 for designating the search attributes by three check boxes and two spin controls. Whether the color printing can be performed or not (803$a$), whether the double printing can be performed or not (803$b$), and whether the stapling can be performed or not (803$c$) can be designated, and the number of print pages 803$d$ and the number of stapling operations 803$e$ can be designated.

In the case where the scanner is selected as an object class (device class), the attributes regarding the scanner are provided for the area 803 to designate the search attributes so as to promote the instruction input from the user by using the check boxes and spin controls.

In the example shown in FIG. 8, since all of the check boxes have been checked, the device in which the color printing, double printing, and stapling can be performed as static conditions (data) and in which the number of sheets loaded is equal to 20 or more and the stapling operation can be performed once as dynamic conditions (data) is searched. As mentioned above, in the invention, the dynamic condition such that the object class indicates the printer is a condition regarding the expendable supplies which are consumed by the execution of the print job.

Reference numeral 804 denotes an area to display the search result. In the area 804 to display the search result, the search result searched by the network device searching server in response to the search request from the client who issues a search request of the device is obtained, and a device name 804$a$ and a network address 804$b$ are provided by a search result program included in the device search request program on the basis of the search result and displayed in the area 804 of the display unit through the OS.

FIG. 9 is a diagram in which the search conditions designated on the screen shown in FIG. 8 and the inquiry conditions to the device searching server are described in accordance with a phraseology of RFC1960 which is issued by IETF. The search request is described as shown in the diagram by the device search request program on the basis of the conditions which are inputted by using the UI (User Interface) in FIG. 8. The search request is issued from the device searching client to the device searching server. In the diagram, reference numeral 901 denotes search conditions. As search conditions 901, there is designated a search request of the device in which the object class (device class)

is the printer, the attributes such that the color printing, double printing, and stapling can be performed are designated as attributes as static conditions, and the conditions such that the number of necessary sheets is equal to 20 and the number of necessary stapling operations is equal to 0 are designated as expendable supplies conditions as dynamic conditions of the printer.

Reference numeral 902 denotes inquiry conditions to the device searching server. As inquiry conditions 902, as explained hereinlater with respect to the operation of the device searching client, in the device searching client of the embodiment, as conditions for inquiring of the device searching server, since only the conditions regarding the object class are extracted from the search conditions and inquired, only the condition such that the object class indicates the printer is shown.

The search from the device searching client to the device searching server is performed along a flow such that an inquiry to designate the object class (device class) is first issued, so that in the case where the adapted device is searched, the search request including the static conditions and the dynamic conditions is issued from the device searching client to the device searching server, so that the device class is extracted. However, a device search request including the device class, static conditions, and dynamic conditions can be also issued from the device searching client to the device searching server from the beginning. It is also possible to control the apparatus in such a manner that only the device class is inquired to the device searching server, the device searching client obtains the search result, and the device adapted to the search conditions is searched in the device searching client and displayed.

It is assumed that each time the search conditions are changed by operating the window shown in FIG. 8 by the user, the search conditions 901 are changed by the CPU 201 in FIG. 2 and temporarily stored in the RAM 203 in FIG. 2.

Figure 10:
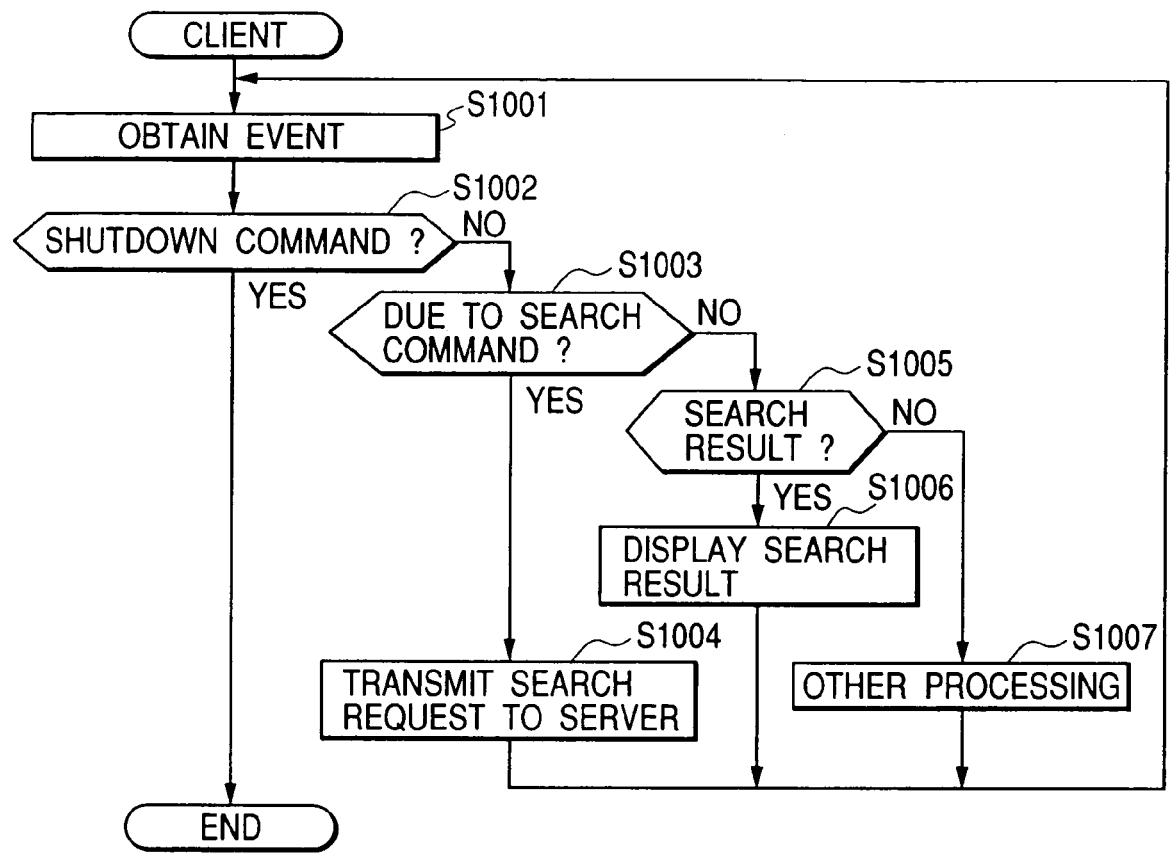
FIG. 10 is a flowchart showing a flow for the operation of the device searching client in the network device searching system according to the first embodiment of the invention.

FIG. 10 is a flowchart showing a flow for the operation of the device searching client. The device searching client is, for example, the desk-top type PC 111 or notebook-sized PC 113 in FIG. 1. The program of the device searching client can be also executed on the device searching server 112 in FIG. 1. The processes in FIG. 10 are realized by a method whereby the CPU 201 reads out the device search request program stored in a memory area (ROM 202, HD 211, or the like) of the device searching client and stores it into the RAM 203 and the CPU 201 executes the device search request program read out and stored in the RAM 203.

An outline of the operation of the device searching client will be first described.

The device searching client is a program of an event driving type and when an event arises, it executes a process about such an event. A loop such that the events are obtained until the system is finished and the events are processed is continued. The main events to be processed are a system shutdown event, a device search request event, and a device search result reception event.

Each step will be described in detail hereinbelow.

In FIG. 10, when the device search request program of the device searching client is activated, first in step S1001, the system waits until an event arises. The event used here denotes that a process for handing an argument to the device search request program is executed. That is, as will be explained hereinlater, there are cases where an operation instruction is inputted by operating a mouse or the like by the user, where some instruction is notified from another software program, where a command is issued from its own lower program, and the like.

When the event arises, the CPU 201 obtains the event and advances to next step S1002. In step S1002, the CPU 201 discriminates whether the event obtained in step S1001 indicates that the user has issued a system shutdown command by using the keyboard 209 in FIG. 2 as a command input unit such as keyboard, pointing device, or the like or not on the basis of the device search request program. If it is determined that the event indicates that the system shutdown command was issued, the CPU 201 finishes the present processing operation.

If it is determined in step S1002 that the event does not indicate that the system shutdown command was issued, step S1003 follows. The CPU 201 discriminates whether the event obtained in step S1001 indicates that the user has issued a device search command by selecting the search menu in the combobox 801 in FIG. 8 or not on the basis of the device search request program. If it is determined that the obtained event is the event due to the issue of the device search command, step S1004 follows. The CPU 201 transmits the device search request to the device searching server 112 in FIG. 1 on the basis of a search request issue program as a lower program of the device search request program. After that, the processing routine is returned to step S1001 and the system waits until the next event arises.

The search requesting operation in step S1004 will be described in detail hereinlater with reference to FIG. 11.

If it is determined in step S1003 that the event is not an event due to the issue of the device search command, step S1005 follows. The CPU 201 discriminates whether the event obtained in step S1001 is an event from the search request issue program as a lower program based on the search result from the device searching server 112 in FIG. 1 in response to the transmission of the device search request transmitted in step S1004 or not. If it is determined that the event is the event due to the reply reception, step S1006 follows. The CPU 201 displays the received search result into an area of the window of FIG. 8 of the display unit via the OS on the basis of a search result display program as a lower program of the device search request program in accordance with the fact that a draw function to display the received search result into the window of FIG. 8 was provided. After that, the processing routine is returned to step S1001 and the system waits until the next event arises.

If it is determined in step S1005 that the event is not the event due to the reply reception, step S1007 follows. The CPU 201 executes other processing. After that, the processing routine is returned to step S1001 and the system waits until the next event arises.

Other processing which is executed in step S1007 is that, for example, a picture plane is drawn again or the like in the case where the program is activated, where the window picture plane is moved by the user, or the like.

Figure 11:
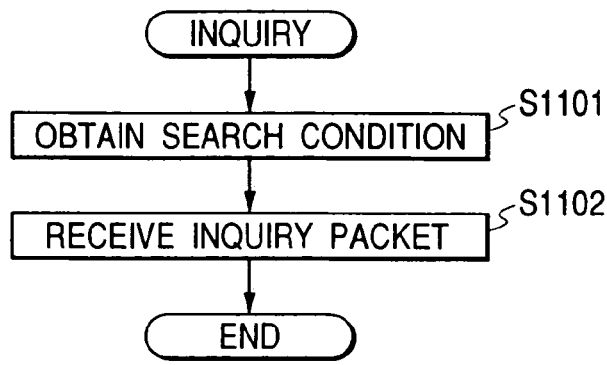
FIG. 11 is a flowchart showing a flow for the processing operation of a device search starting step in the device searching client in the network device searching system according to the first embodiment of the invention.

FIG. 11 is a flowchart showing a flow for the search requesting operation in step S1004 in FIG. 10. This process is executed by the CPU 201 on the basis of the search request issue program as a lower program (lower module) of the device search request program.

In the search requesting operation, first in step S1101, the CPU 201 accesses to the RAM 203 in FIG. 2 and obtains the pre-registered search conditions as described in FIG. 9 on the basis of the search request issue program. The object class (device class), static conditions (device function information), and dynamic conditions (expendable supplies information) are included in the search conditions. Subsequently, in step S1102, the CPU 201 extracts only the condition regarding the object class from the search conditions on the basis of the search request issue program, transmits it to the device searching server 112 in FIG. 1, requests for a search of the network device, and obtains the search result from the device searching server 112. The search result obtained here is constructed by a device list form including the device function information as static data and the expendable supplies information as dynamic data. The search request issue program refers to/searches the device list (search result) obtained from the device searching server 112 and the search conditions (search conditions inputted via the user interface in FIG. 8) which have already been held (discriminates whether they coincide or not), extracts the device which meets both of the static conditions as conditions designated by the user and the dynamic conditions, and event-notifies the device search request program as an upper program of the information of the extracted device. After that, the processing operation is finished.

As mentioned above, the device searching client extracts the device class from the search conditions which are inputted by the user and inquires of the device searching server 112 by using the device class as a search condition, so that a list of devices in which the device class coincides can be obtained from the device searching server 112. In the device searching client, the search conditions held in the RAM 203 and the obtained device list are referred to (searched), and the device whose static conditions and dynamic conditions coincide with them is event-notified as a search result to the device search program as an upper program. As mentioned above, by processing the detailed search by the device searching client side, effects such that a load of the device searching server is lightened and a throughput of the searching process as a system is improved are obtained.

As a search result which is obtained by the search request issue program from the device searching server 112, a device list which includes the device function information (double printing function, stapling function) as static information and does not include the expendable supplies information (the number of sheets loaded, the number of staples remaining) as dynamic information can be also obtained, and the device searching client can directly inquire of the device with respect to the getting of the dynamic information. In this case, the search request issue program as a lower module of the device search request program issues a command for inquiring the portion of the dynamic information among the search conditions designated by the user to each device mentioned as a search result from the device searching server and obtains the dynamic information from each device. A device search desired by the user is performed on the basis of the dynamic information obtained from each device. Processes on the device side for the request from the device searching client will be described hereinlater with reference to FIG. 13.

In the above processes, the operation to search a portion one by one by both the device searching server 112 and device searching client 111 (113) is not efficient because the search program is necessary for both the device searching client and the device searching server. Therefore, all of the searching processes can be also executed on the device searching server 112 side. In this case, the search request issue program as a lower module of the device search request program does not extract only the device class from the search conditions but issues the search conditions as they are as a search request to the device searching server 112. The search result obtained from the device searching server 112 is event-notified to the device search request program as an upper module.

In the embodiment, it is assumed that the address of the device searching server 112 has previously been known because, for example, the value inputted by the user by using the keyboard 209 in FIG. 2 serving as a command input unit is written onto the hard disk 211 in FIG. 2 and is read out or the like. However, it is not limited to such a case.

As another method, for instance, such an address can be also obtained from a network by using a method like a double space in the programming language Linda. There are various papers and descriptions about the programming language Linda and it has been disclosed in, for example, the following paper.

"D. Gelernter, "Generative Communication in Linda", ACM Transactions on Programming Languages and Systems, Vol. 7, No. 1, pp 80 to 112, 1985"

Figure 12:
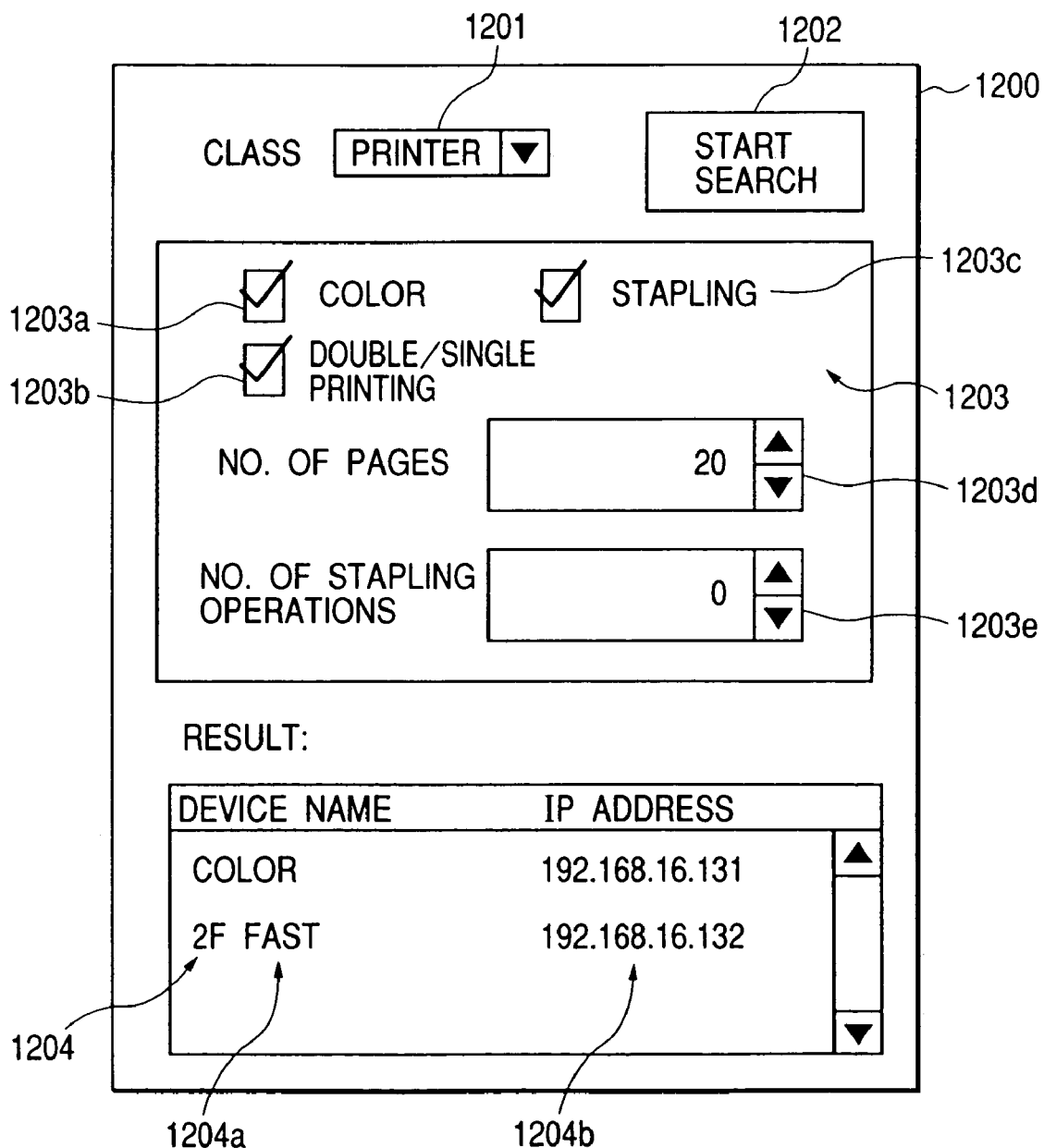
FIG. 12 is a diagram showing a screen display example of the device searching client after completion of the searching operation.

FIG. 12 is a diagram showing a screen display example of the device searching client whose searching operation has been finished. In the diagram, reference numeral 1200 denotes a window in which various information is displayed. Reference numeral 1201 denotes a combobox to designate the object class of the device to be searched. By operating the combobox 1201, the object class of the device to be searched can be changed to, for example, "printer", "scanner", or the like. In accordance with this change, the search attribute condition in an area 1203 to designate search attributes are changed to the attributes according to the object class.

Reference numeral 1202 denotes a start search button. The user presses the start search button 1202 by using the keyboard 209 in FIG. 2 serving as a command input unit such as keyboard, pointing device, or the like, thereby making it possible to inquire of the device searching server to see if there is a device which meets the conditions.

Reference numeral 1203 denotes the area to designate the search attributes. Since the printer has been selected as an object class in the combobox 1201 at present, the attributes regarding the printer are shown in the area 1203 to designate the search attributes by three check boxes and two spin controls. Whether the color printing can be performed or not (1203*a*), whether the double printing can be performed or not (1203*b*), whether the stapling operation can be performed or not (1203*c*), and the number of print pages (1203*d*) and the number of stapling operations (1203*e*) can be designated, respectively.

In the example shown in FIG. 12, since all of the check boxes have been marked, the device in which the color printing, the double printing, and the stapling can be performed and in which the number of sheets loaded is equal to or larger than 20 and the number of stapling operations is equal to "0" is searched.

Reference numeral 1204 denotes an area to display the search result. A device name 1204*a* and a network address 1204*b* are displayed in the area 1204 for displaying the search result.

In the embodiment, the device in which the object class indicates the printer, the color printing, the double printing, and the stapling can be performed, the number of print pages is equal to 20, and the number of stapling operations is equal to "0" is searched. As devices which perfectly meet those conditions, the devices with the names "Mr. Color" and "2F FAST" (high speed printer at the second floor) exist. Therefore, the information regarding those devices is displayed in the area 1204 to display the search result in FIG. 12.

As mentioned above, in the case where the device connected to the network is searched, since the system has the search condition input means (user interface shown in FIGS. 8 and 12) for allowing the user to input not only the static data but also the dynamic data as search conditions, if the expendable supplies information which is used as dynamic data by the print job is allocated and the device is searched, a situation such that in the case where the printing matter is printed by the searched device, the printing operation is stopped during the operation because of a reason such as absence of papers, absence of staples, or the like is prevented.

Since the system has the discriminating means (corresponding to the process of the CPU 201 based on the flowchart shown in FIG. 11) for discriminating whether the search result obtained from the device searching server coincides with the conditions inputted by the search condition input means or not, the search process in which the load is distributed to both the device searching server and the device searching client can be realized. The load of the server can be reduced.

A construction and the operation of the printer will now be described.

Figure 13:
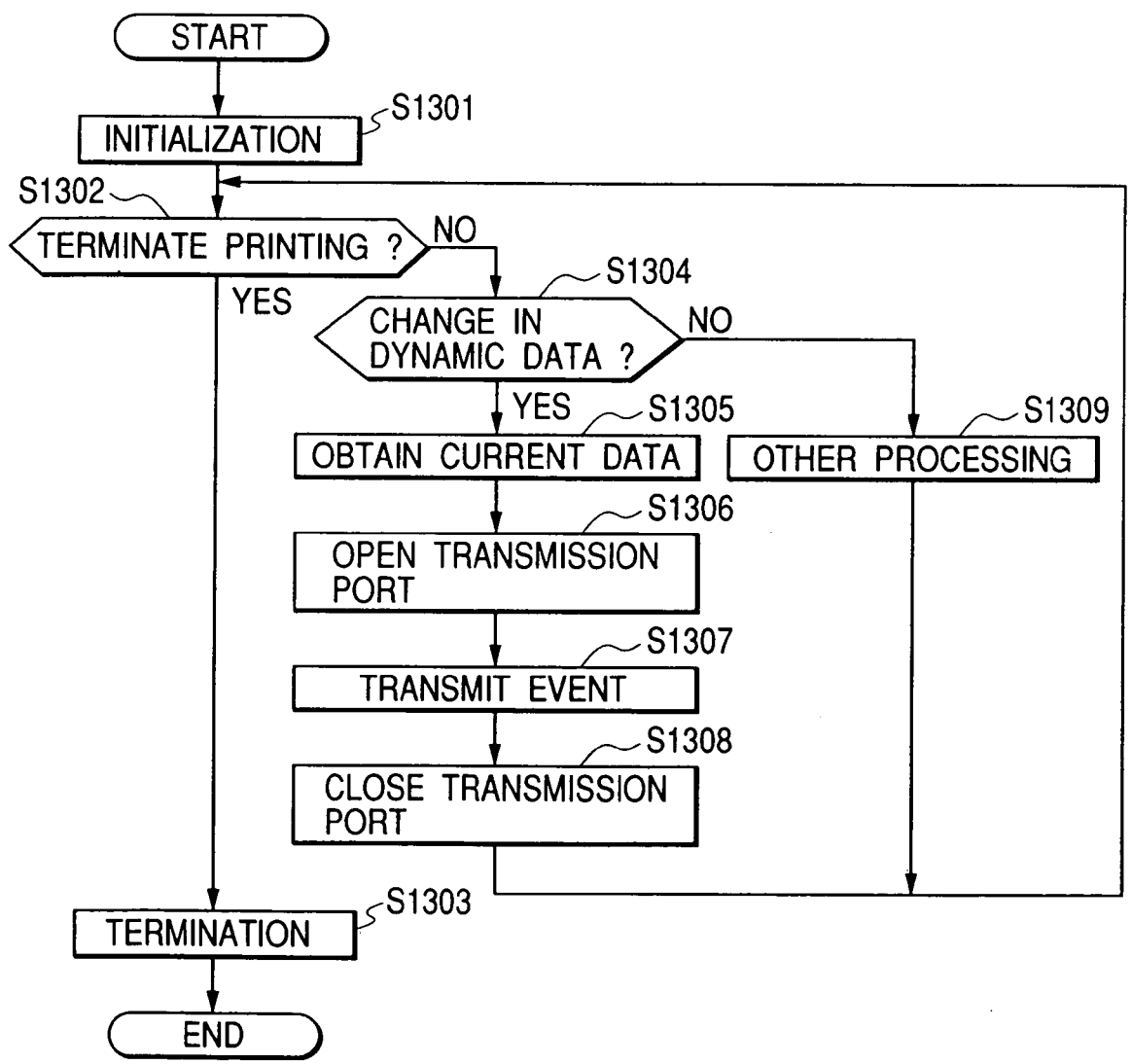
FIG. 13 is a flowchart for explaining a mechanism in a range from a detection of dynamic data of a printer to a transmission of an event in the network device searching system according to the first embodiment of the invention.

FIG. 13 is a flowchart showing a flow for the operation to register the dynamic data into the device searching server 112 in FIG. 1 in the printer 300 in FIG. 3. The discrimination and execution of those series of processes are executed by the CPU 301 in the printer 300 in FIG. 3 in a hardware manner. The sensor (including the sensor for completion of the paper ejection, the sensor for the number of sheets loaded, the sensor for the number of staples remaining, and the like) to detect the dynamic data such as number of sheets loaded, number of staples remaining, and the like is included in the controller 307 in FIG. 3. The search result passes through the main bus 304 in FIG. 3, transferred to the CPU 301 in FIG. 3, and used for discrimination and execution of the series of processes.

In FIG. 13, when a power source of the printer 300 is turned on, first in step S1301, several initializing processes are executed and the system enters a print waiting state. Upon initialization, the CPU 301 obtains the device function information and expendable supplies information on the basis of a device information registration program stored in the ROM 302 by a method, which will be explained hereinlater, and registered as device information into the database of the device searching server 112 via the network as shown in FIG. 4. The device function information registration program as a lower module of the device information registration program is a module for obtaining the device function information and expendable supplies information upon initialization of the device and event-notifying the device information registration program as an upper module. The core unit of the device information registration program as an upper module is a module for requesting to register the event-notified device information (including the device class, device function information, and expendable supplies information) into the database of the device searching server 112 via the network. The processes in next step S1302 and subsequent steps correspond to the control of the CPU 301 based on an expendable supplies information registration program (also called a registration information updating program) as a lower module of the device information registration program.

Subsequently, in step S1302, the CPU 301 discriminates whether a power shutdown command has been received or not (the printing is terminated or not). If it is determined that the printing is terminated, step S1303 follows and the CPU 301 executes a terminating process. After that, the present processing operation is finished.

If it is determined in step S1302 that the printing is not terminated, step S1304 follows. Whether a notification indicative of a change in dynamic data such that the printing is executed or the like, for example, has been sent from various sensors or not is discriminated. If it is determined that the notification indicative of a change in dynamic data has been sent from the various sensors, step S1305 follows. The CPU 301 confirms in which data the change has occurred and obtains the present data.

In step S1306, subsequently, the CPU 301 opens a transmission port. In step S1307, the CPU 301 transmits an updating event of the dynamic data to the device searching server 112 in FIG. 1. The updating event is constructed by a registration update command, a code indicative of the kind of dynamic data, and data showing the number of dynamic data. When the transmission is completed, next step S1308 follows and the transmission port is closed. After that, the processing routine is returned to step S1302 and the system again enters a command (event) waiting state.

As a case where there is a change in dynamic data as mentioned above, there is considered a case where, for example, the printing is performed and one sheet of paper is used, so that the sensor of the number of sheets loaded detects that the number of sheets is reduced by "1". It is also possible to consider a case where the printing is performed, the last stapling operation is performed, and the staple for stapling is used once, so that the sensor for the number of staples remaining detects that the number of staples remaining has been reduced by "1", or the like. There is also another sensor for detecting a change in dynamic data and its value can be also obtained.

In step S1307, the operation of the device searching server 112 after the generation of the updating event is as mentioned above and corresponds to steps S508 and S509 in FIG. 5. Thus, the device searching server 112 can always have the latest dynamic data.

If it is determined in step S1304 that there is no change in dynamic data, step S1309 follows. The CPU 301 executes other processing and, thereafter, the processing routine is returned to step S1302. The system again enters a command (event) waiting state.

As mentioned above, although the process for registering/updating the dynamic data (expendable supplies information) into the device searching server is performed in the case where there is a change in dynamic data, the timing when there is a change in dynamic data is considered to be a timing when the print processing is performed. The timing when the print processing is performed here includes not only the case where the registering/updating process is executed each time one paper is ejected while the print output of the print job is being executed but also the case where after the print output of the print job for performing a series of printing processes, the dynamic data changed by the print job is collectively registered/updated.

In the flowchart of FIG. 13, whether there is a change in dynamic data or not is discriminated in step S1304. If there is the change in dynamic data, the processing routine advances to step S1305. However, the invention is not limited to such a process.

As other processing, the dynamic data shown by the data which is inputted from the device searching client to search the device can be also obtained in subsequent step S1305. Specifically speaking, if it is determined by the CPU 301 that the number of sheets has been designated as expendable supplies information by the device searching client in step S1304, the CPU 301 obtains the data detected by the sensor 310 (sensor for the number of sheets loaded) in step S1305. In steps S1306 and S1307, the CPU 301 event-transmits the obtained dynamic data (the number of sheets loaded) to the device searching client. The device such as a printer or the like detects and obtains the dynamic data shown by the data which is inputted from the device searching client to search the device and event-transmits it as mentioned above. Therefore, the device searching client can search the device, by himself, which meets the dynamic conditions requested by the user on the basis of the dynamic data obtained from the device on the network.

As mentioned above, since the system has: the control means (corresponding to the process of the CPU 301) for allowing the detecting means (sensor 310) to detect the dynamic data (expendable supplies information) which is specified by the instruction inputted from the device searching client to search the device among the devices connected to the network; and the data notifying means (corresponding to the process of the CPU 301) for notifying the device searching client of the detected dynamic data. Therefore, the dynamic data can be detected and notified in response to the request from the device searching client.

The system has: the first registering means (corresponding to the process of the CPU 301 based on the device function information registering program) for registering the data (device function information) of the ability of the main body of the device into the database of the device searching server at a predetermined timing (at the time of initialization); and the second registering means (corresponding to the process of the CPU 301 based on the expendable supplies information registering program (registration information updating program) for registering the data (expendable supplies information) which is necessary for printing and dynamically changes into the database of the device searching server at an arbitrary timing (at the time of print processing in the first embodiment). Therefore, since the ability data of the device main body is hardly changed, the data which is registered into the device searching server at a predetermined timing and is necessary for printing and dynamically changes can be registered into the device searching server at an arbitrary timing.

Figure 14:
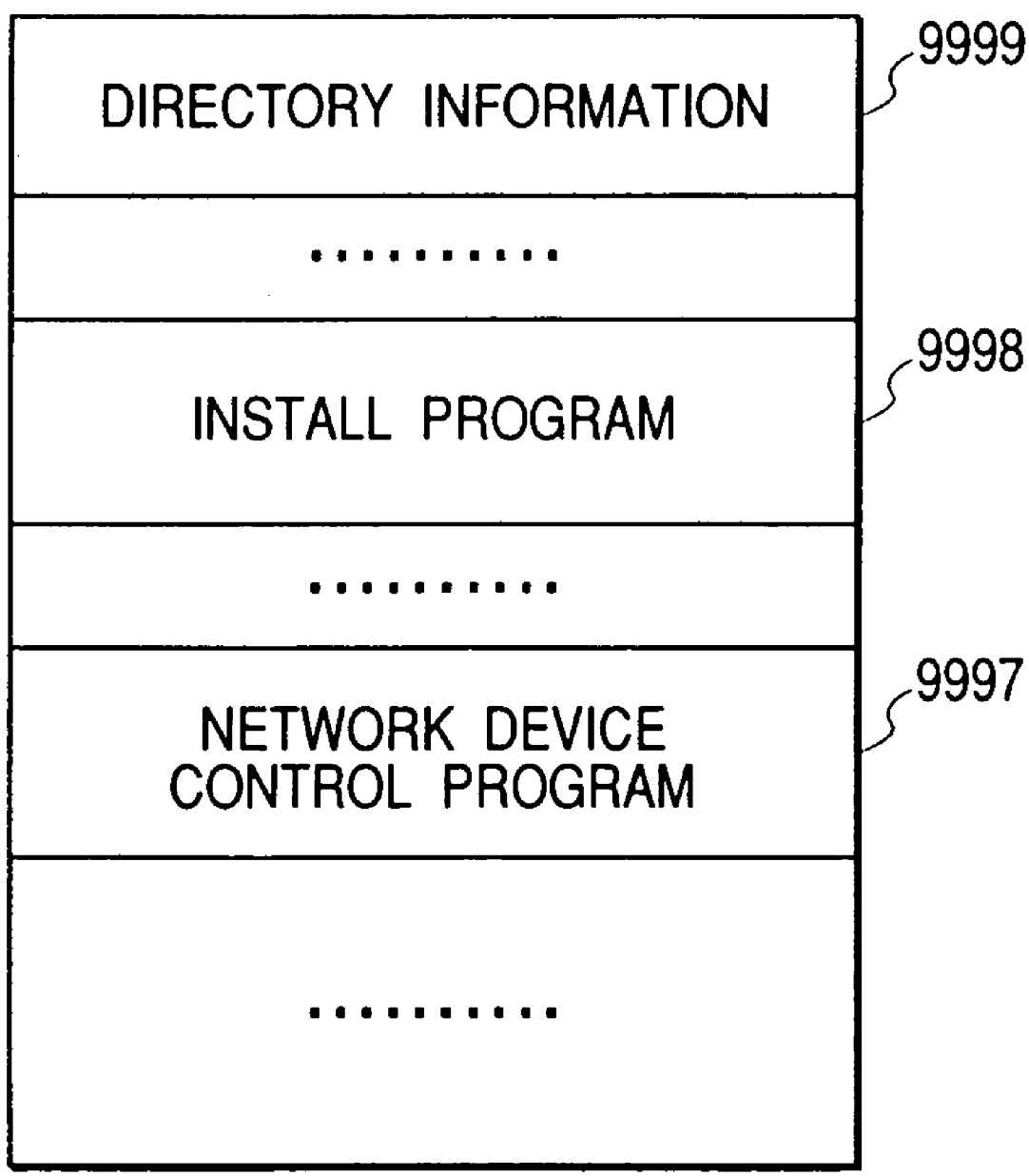
FIG. 14 is a diagram showing a memory map in a storage medium of device searching software in the network device searching system according to the first embodiment of the invention.

FIG. 14 is a diagram showing a memory map in a CD-ROM as an example of the storage medium. In the diagram, reference numeral 9997 denotes an area in which a network device control program has been stored; 9998 an area in which an install program has been stored; and 9999 an area in which directory information has been stored.

When the network control program is installed into the PC 200, the install program stored in the area 9998 in which the install program has been stored is first loaded into the system and executed by the CPU 201. Subsequently, the install program to be executed by the CPU 201 reads out the network device control program from the area 9997 in which the network device control program has been stored and stores it onto the hard disk 211.

The invention can be applied to a system or integrated apparatus comprising a plurality of apparatuses (for example, a host computer, interface equipment, a reader, and the like) or can be also applied to an apparatus comprising one equipment.

The objects of the invention are also accomplished by a method whereby a storage medium in which program codes (control program) of software to realize the functions of the embodiment mentioned above is supplied to a system or an apparatus and a computer (including a CPU or an MPU) of the system or apparatus reads out and executes the program codes stored in the storage medium.

In this case, the program codes themselves read out from the storage medium realize the novel functions of the invention and the storage medium in which the program codes have been stored constructs the invention.

In the device searching client, device, device searching server, and device searching system according to the invention, the computer reads out and executes the control program stored in the storage medium, so that the functions of the embodiment mentioned above are realized. However, the invention is not limited to such a case but also incorporates a case where the OS (Operating System) or the like which is operating on a computer executes a part or all of the actual processes on the basis of instructions of the control program and the functions of the embodiment mentioned above are realized by those processes.

For example, a floppy disk, a hard disk, an optical disk, a magnetooptic disk, a CD-ROM, a CD-R, a magnetic tape, a non-volatile memory card, an ROM chip, a DVD, or the like can be used as a storage medium for supplying the program codes.

Further, the program codes read out from the storage medium are written into a memory equipped for a function expanding board inserted in a computer or a function expanding unit connected to the computer and, thereafter, a CPU or the like equipped for the function expanding board or function expanding unit executes a part or all of the actual processes on the basis of instructions of the program codes, and the functions of the embodiment mentioned above can be realized by those processes.

The invention can be also applied to a case where the program codes of the software to realize the functions of the embodiment mentioned above are stored in the storage medium and the program is distributed from the storage medium to a requester through a communication line such as personal computer communication or the like.

Second Embodiment

In the first embodiment, for example, the event is transmitted each time the number of sheets is reduced by "1". However, when considering a network traffic, for example, if 100 pages are printed, the event is transmitted 100 times, so that there is a possibility of the occurrence of a problem.

In the second embodiment of the invention, therefore, a change in detection signal of the sensor for the number of sheets loaded is ignored, and at a point when the printing of the last page is finished, an event showing that the last page has been outputted is used as a trigger, and one event is transmitted in response to one printing operation synchronously with a count output of a counter for counting the number of papers outputted.

In this case, however, when the printer is printing, the number of sheets loaded in the device searching server and the number of loaded sheets which is counted after the printing are different, so that the number of sheets loaded cannot be accurately detected. In such a case, it is also possible to use a method whereby during the printing, the device searching server does not return a search result until the end of the printing.

Third Embodiment

In the foregoing first embodiment, for example, each time the number of sheets is reduced by "1", the number of remaining sheets loaded is accurately counted and the database in the device searching server is updated.

However, actually, there is also a case where it is difficult to realize such a construction because of a reason such that a sensor to detect the number of sheets loaded one by one is expensive or the like.

In the third embodiment of the invention, therefore, the dynamic data is not accurately detected but is classified into stages (levels) such that no trouble occurs in the printing, namely, the dynamic data is classified into levels of three or more stages by providing a plurality of threshold values in such a manner that a stage at which the number of remaining sheets is equal to 0 is set to level 1, a stage at which the number of remaining sheets lies within a range from 1 to 50 is set to level 2, and a stage at which the number of remaining sheets lies within a range from 51 to 100 is set to level 3, thereby detecting the number of sheets loaded and updating the database in the device searching server.

In this case, however, with respect to the dynamic data, for example, a specific value such as remaining 81 sheets of papers is not inputted in the database in the device searching server as in the first embodiment mentioned above but a level value is inputted. However, as for the data format, it is sufficient that the level can be recognized and searched. Various data formats are also available.

Fourth Embodiment

In the first to third embodiments mentioned above, the data format of the dynamic data is fixed every device.

However, there is no need to fix the data format of the dynamic data. That is, the accurate data can be detected by an option switch or the like of the device or the level can be also detected step by step.

As many apparently widely different embodiments of the present invention can be made without departing from the spirit and scope thereof, it is to be understood that the invention is not limited to the specific embodiments thereof except as defined in the appended claims.

As described in detail above, according to the device searching method, device searching client, device, device searching server, device searching system, and device searching apparatus of the invention, for example, the person who prints can correctly search the device in accordance with the search conditions in consideration of the dynamic data, so that there is such an effect that the proper device is selected with respect to a printing matter (print job) to be printed at present and the printing can be smoothly performed.

According to the storage medium of the invention, there is such an effect that the device searching client, device, device searching server, device searching system, and device searching apparatus of the invention can be smoothly controlled.

What is claimed is:

1. A device searching method of a device searching system for searching an output device connected to a network, the devices searching system including a host computer, a server and a plurality of output devices, said method comprising:

a first input step, executed in the host computer, of indicating an input of static data of the output device as a search condition for searching the output device, the static data comprising device function information indicating an ability of the output device;

a second input step, executed in the host computer, of indicating an input of dynamic data of the output device as a search condition for searching the output device, the dynamic data including at least first expendable supplies information indicating an amount of expendable supplies for a printing process;

a search step, executed in the server, of searching, based on the static data input in said first input step and the dynamic data input in said second input step, a database for an output device preserving an amount of expendable supplies for the printing process larger than the amount of expendable supplies indicated by the first expendable supplies information;

an update step, executed in the server, of updating device function information and expendable supplies information of the output device retained in the database in response to a notification from the output device;

a notification step, executed in the server, of notifying the host computer of a search result obtained in said search step;

a first transmission step, executed in the output device, of voluntarily transmitting a registration request including static data comprising the device function information indicating the ability of the output device to the server in response to initialization of the output device;

a discrimination step, executed in the output device, of discriminating whether a remaining amount of expendable supplies has changed due to execution of the printing process; and a second transmission step, executed in the output device, of voluntarily transmitting a registration update command including dynamic data comprising at least the remaining amount of expendable supplies to the server, if the remaining amount has changed is discriminated in said discrimination step, wherein said update step generates a new record, in the database, including the device function information of the output device in accordance with a new registration request transmitted from the output device in said first transmission step and updates the expendable supplies information of the output device included in the generated new record in accordance with a registration update command transmitted from the output device in said second transmission step, wherein the output device has the static data comprising the device function information and the dynamic data comprising the remaining amount of expendable supplies as information to be transmitted to the server, and wherein said first transmission step transmits the static data among the information to be transmitted to the server and said second transmission step transmits the dynamic data among the information to be transmitted to the server.

2. A method according to claim 1, further comprising:

a requesting step of requesting the server to search the output device through the network by using the inputted conditions in said first and second input step, wherein said notifying step notifies a user of the search result received from the server in accordance with the search request.

3. A method according to claim 1, further comprising:

a discriminating step of discriminating whether the search result received from the server coincides with the inputted conditions in said first and second input step in accordance with a search request, wherein said notifying step notifies a user of the search result if the search result and the inputted conditions in said first and second input step coincide is determined in said discriminating step.

4. A method according to claim 1, further comprising:

a third input step of indicating an input of an output device class indicative of a type of output device to be searched as a search condition for searching the output device.

5. A method according to claim 1, further comprising:

a requesting step of requesting the server through the network to search the output device by using the device function information inputted in said first input step; and an inquiry step of inquiring of the output device on the network about the expendable supplies information inputted in said second input step.

6. A computer-readable storage medium which stores a control program for controlling a device searching system for searching an output device connected to a network, the device searching system including a host computer, a server and a plurality of output devices, wherein said control program comprises:
   a first user interface providing module, in the host computer, for providing a user interface to indicate an input of static data of the output device as a search condition for searching the output device, the static data comprising device function information indicating an ability of the output device;
   a second user interface providing module, in the host computer, for providing a user interface to indicate an input of dynamic data of the output device as a search condition for searching the output device, the dynamic data including at least first expendable supplies information indicating an amount of expendable supplies for a printing process;
   a searching module, in the server, for searching, based on the static data input in said first user interface providing module and the dynamic data input in said second user interface providing module, a database for an output device preserving an amount of expendable supplies for the printing process larger than the amount of expendable supplies indicated by the first expendable supplies information;
   an updating module, in the server, for updating device function information and expendable supplies information of the output device retained in the database in response to a notification from the output device;
   a notification module, in the server, for notifying the host computer of a search result obtained in said searching module;
   a first transmitting module, in the output device, for voluntarily transmitting a registration request including static data comprising the device function information indicating the ability of the output device to the server in response to initialization of the output device;
   a discriminating module, in the output device, for discriminating whether a remaining amount of expendable supplies has changed due to execution of the printing process; and
   a second transmitting module, in the output device, for voluntarily transmitting a registration update command including dynamic data comprising at least the remaining amount of expendable supplies to the server, if the remaining amount has changed is discriminated by said discriminating module,
   wherein said updating module generates a new record, in the database, including the device function information of the output device in accordance with a new registration request transmitted from the output device in said first transmitting module and updates the expendable supplies information of the output device included in the generated new record in accordance with a registration update command transmitted from the output device in said second transmitting module,
   wherein the output device has the static data comprising the device function information and the dynamic data comprising the remaining amount of expendable supplies as information to be transmitted to the server, and
   wherein said first transmitting module transmits the static data among the information to be transmitted to the server and said second transmitting module transmits the dynamic data among the information to be transmitted to the server.

7. A program product including a computer-readable control program stored in a computer-readable storage medium for controlling a device searching system for searching an output device connected to a network, the device searching system including a host computer, a server and a plurality of output devices, said program comprising:
   a first user interface providing module, in the host computer, for providing a user interface to indicate an input of static data of the output device as a search condition for searching the output device, the static data comprising device function information indicating an ability of the output device;
   a second user interface providing module, in the host computer, for providing a user interface to indicate an input of dynamic data of the output device as a search condition for searching the output device, the dynamic data including at least first expendable supplies information indicating an amount of expendable supplies for a printing process;
   a searching module, in the server, for searching, based on the static data input in said first user interface providing module and a plurality of types of dynamic data input in said second user interface providing module, a database for an output device preserving an amount of expendable supplies for the printing process larger than the amount of expendable supplies indicated by the first expendable supplies information;
   an updating module, in the server, for updating device function information and expendable supplies information of the output device retained in the database in response to a notification from the output device;
   a notification module, in the server, for notifying the host computer of a search result obtained in said searching module;
   a first transmitting module, in the output device, for voluntarily transmitting a registration request including static data comprising the device function information indicating the ability of the output device to the server in response to initialization of the output device;
   a discriminating module, in the output device, for discriminating whether a remaining amount of expendable supplies has changed due to execution of the printing process; and
   a second transmitting module, in the output device, for voluntarily transmitting a registration update command including dynamic data comprising at least the remaining amount of expendable supplies to the server, if the remaining amount has changed is discriminated by said discriminating module,
   wherein said updating module generates a new record, in the database, including the device function information of the output device in accordance with a new registration request transmitted from the output device in said first transmitting module and updates the expendable supplies information of the output device included in the generated new record in accordance with a registration update command transmitted from the output device in said second transmitting module,
   wherein the output device has the static data comprising the device function information and the dynamic data comprising the remaining amount of expendable supplies as information to be transmitted to the server, and
   wherein said first transmitting module transmits the static data among the information to be transmitted to the server and said second transmitting module transmits the dynamic data among the information to be transmitted to the server.

* * * * *

UNITED STATES PATENT AND TRADEMARK OFFICE
CERTIFICATE OF CORRECTION

PATENT NO. : 7,127,451 B1 Page 1 of 1
APPLICATION NO. : 09/629972
DATED : October 24, 2006
INVENTOR(S) : Yoshio Kimura It is certified that error appears in the above-identified patent and that said Letters Patent is hereby corrected as shown below:

DRAWINGS:
Sheet 6, Figure 6, "COMPLELTED" should read -- COMPLETED --.

COLUMN 1:
Line 22, "used" should read -- is used --.

COLUMN 19:
Line 49, "devices" should read -- device --.

Signed and Sealed this

Twenty-ninth Day of May, 2007

JON W. DUDAS
*Director of the United States Patent and Trademark Office*